United States Patent [19]
Hosoya

[11] Patent Number: 5,860,709
[45] Date of Patent: *Jan. 19, 1999

[54] BRAKE PRESSURE CONTROL DEVICE

[75] Inventor: Yukio Hosoya, Hamakita, Japan

[73] Assignee: Nisshinbo Industries Inc., Tokyo, Japan

[*] Notice: The term of this patent shall not extend beyond the expiration date of Pat. No. 5,713,641.

[21] Appl. No.: 779,075

[22] Filed: Jan. 8, 1997

[30] Foreign Application Priority Data

Jan. 16, 1996 [JP] Japan ..................................... 8-023146

[51] Int. Cl.⁶ ................................. B60T 8/50; B60T 8/36
[52] U.S. Cl. ..................................... 303/117.1; 303/119.2; 303/900; 303/116.1
[58] Field of Search ............................. 303/119.2, 117.1, 303/116.1, 116.2, 900, 901, 113.2, 113.1, 119.3; 251/129.15, 129.01; 137/596.17

[56] References Cited

U.S. PATENT DOCUMENTS 5,094,512  3/1992  Kohno et al. ......................... 303/117.1
5,221,129  6/1993  Takasaki .............................. 303/119.2
5,713,641  2/1998  Hosoya ................................... 303/900

*Primary Examiner*—Douglas C. Butler
*Attorney, Agent, or Firm*—Nikaido, Marmelstein, Murray & Oram LLP

[57] ABSTRACT

A brake pressure control device that prevents the accumulation of contaminants, thereby ensuring that the pressure can rise again during an antilock control operation or provide sufficient pressure during sudden braking, thereby ensuring a high degree of safety. A piston (16), housing a valve plug (24), is mounted inside a cavity (12), wherein a primary variable restrictor (32), formed between the cavity and the piston, and a secondary variable restrictor (33) and a third variable restrictor (34), both formed between the piston and the valve plug, are arranged sequentially. A fluid path with passage to the main brake line on the wheel cylinder side is connected between the secondary variable restrictor and third variable restrictor.

6 Claims, 11 Drawing Sheets

BRAKE PRESSURE CONTROL DEVICE

BACKGROUND OF THE INVENTION

Generally, brake pressure control devices are equipped with a large number of electromagnetically-actuated valves used as inlet valves and exhaust valves. However, in order to reduce the number of these solenoid valves, a variety of brake pressure control devices have been disclosed in which the inlet valves are hydraulically actuated instead of electromagnetically actuated.

For example, in the device disclosed in Publication of Unexamined Japanese Patent Application Heisei 1(1989)-306357, as shown in FIG. 14, a main brake line 62 connects the master cylinder 60 to a wheel cylinder 61, an exhaust line 63 branches from the main brake line 62 with a hydraulically actuated flow control valve 64 provided at the point of the branching, and a conventional electromagnetically-actuated exhaust valve 65 is provided in the exhaust line 63.

The flow control valve 64 includes an inner cylinder 67 housed inside a cavity 66, a spool 69 housed to slide inside the inner cylinder 67 and forming a fixed-diameter orifice 68 therein, and return springs 70 which energize the spool 69 towards the closed end of the cavity 66. A plural number of fluid ducts are bored through the inner cylinder 67 and spool 69 in the radial direction.

The brake pressure control device of a type as described is subject to certain potential problems.

The flow control valve has a large brake fluid path formed from an inlet port 71, fluid ducts 72–76, and a primary outlet port 77.

In order to rise the pressure again during an antilock braking (ABS), the spool 69 drops thereby blocking the large fluid path, wherein the brake fluid is bypassed through the fixed-diameter orifice 68 of small cross section and supplied to the wheel cylinder 61. The cross section diameter of the fixed-diameter orifice 68 is extremely small, of the order between 0.2 mm–0.3 mm, in which case contaminants can readily accumulate and are removable only by physically dismantling and cleaning the device. A buildup of contaminants will block the fluid flow necessary for the brake pressure to rise, and braking force will be inadequate.

During sudden braking when the spool 69 moves towards the return spring chamber 80, the large fluid path becomes constricted or blocked, creating the danger of insufficient braking force. That is, during sudden braking when a strong fluid force acts on the spool 69, it is pushed towards the return spring chamber 80. The brake fluid inside the return spring chamber 80 is thereby compressed and forced around the exterior of the spool 69 and out through the fluid duct 78 which has passage to the wheel cylinder 61. This allows the spool 69 to drop (that is, move farther towards the return spring chamber 80), constricting or blocking the fluid path between the two fluid ducts 75 and 76, resulting in an insufficient braking force.

In the brake pressure control device as described, a plural number of fluid ducts 72, 73, 75, 76, 78, 79 must be bored in the radial direction through the inner cylinder 67 and spool 69. The fabrication of these ducts increases the cost of the device.

OBJECT AND SUMMARY OF THE INVENTION

This invention was devised to resolve the aforementioned potential problems, and to this end, its objects are as follows.

An object of this invention is to provide a brake pressure control device that prevents the accumulation of contaminants, thereby ensuring that the pressure can rise again during an ABS or traction control (TCS) action, thus ensuring a high degree of safety.

Another object of this invention is to provide a brake pressure control device that will provide sufficient braking pressure during sudden braking, thereby assuring a high degree of safety.

A further object of this invention is to provide a small, inexpensive brake pressure control device that requires a fewer number of fluid ducts.

As a means of accomplishing the above objects, this invention provides a brake pressure control device comprising an exhaust line branching off from the main brake line connecting a pressure generating source to a wheel brake, a flow control valve that increases or decreases the brake pressure by a controlled ratio installed at point of the branching, and an exhaust valve that reduces the wheel brake pressure installed between the flow control valve and the exhaust line. The flow control valve includes a piston having a through-hole in the axial direction housed to slide inside a cavity and a valve plug housed to move in the axial direction within the through-hole. An inlet port connected to the main brake line on the side of the pressure generating source, an outlet port connected to the main brake line on the wheel brake side, and an exhaust port connected to the exhaust valve are formed in the housing opening into the cavity. The piston has a primary fluid vent connected between the inlet port and the throughhole, and a secondary fluid vent connected between the outlet port and the through-hole. Moreover, three variable restrictors are arranged in series. A primary variable restrictor is formed between the inlet port and the primary fluid vent and has the cross sectional area of its fluid path changed with the movement of the piston to form a small fluid path during a control operation and a large fluid path during normal braking. A secondary variable restrictor is formed from an annular primary valve seat, extending from the inner surface of the through-hole between the primary fluid vent and secondary fluid vent and the upper portion of the valve plug which passes through the primary valve seat, and has the cross sectional area of its fluid path changed with the relative movement of the piston and valve plug such that during a control operation, a small fluid path is formed by a groove formed in the axial direction on the outer circumference of the valve plug, and during normal braking, a large fluid path is formed between the inner surface of the primary valve seat and the outer circumference of the valve plug. A tertiary variable restrictor is formed from an annular secondary valve seat, extending from the inner surface of the through-hole on the exhaust port side of the secondary fluid vent and the lower portion of the valve plug which passes through the secondary valve seat, and has the cross sectional area of its fluid path changed with the relative movement of the piston and valve plug such that during a control operation, a large fluid path is formed between the inner surface of the secondary valve seat and the outer circumference of the valve plug, and during normal braking, a small fluid path is formed between the inner surface of the secondary valve seat and the outer circumference of the valve plug.

In another configuration, an axial duct and a radial duct connected thereto, are formed inside the upper portion of the valve plug, and the groove is provided in the axial direction on the outer circumference of the valve plug so as to connect with the radial duct. The secondary variable restrictor is formed such that during a control operation, a small fluid path is formed by the groove, and during normal braking, a large fluid path is formed with the radial duct. The groove need not be formed on the valve plug, but can be formed in the axial direction on the inner surface of the primary valve seat. In this case, the groove can comprise a small groove formed on the primary fluid vent side and a large groove formed on the secondary fluid vent side.

Moreover, the piston can be configured such that an annular valve seat extends from the inner surface of the through-hole between the primary fluid vent and the exhaust outlet, and a secondary fluid vent is formed in the radial direction on the valve seat to enable passage between the outlet port and the through-hole. In such a structure, the valve plug has a central enlarged diameter segment so as to be movable in the axial direction inside the valve seat. The groove is formed in the axial direction along the outer circumference of the enlarged-diameter segment. The secondary variable restrictor is formed by the edge of the upper portion of the enlarged-diameter segment and the valve seat, and the tertiary variable restrictor is formed by the edge of the lower portion of the enlarged-diameter segment and the valve seat. During a control operation, the secondary variable restrictor forms a small fluid path with the groove, and the tertiary variable restrictor forms a large fluid path between the secondary fluid vent and the outer circumference of the edge of the lower portion of the enlarged-diameter segment of the valve plug. During normal braking, the secondary variable restrictor forms a large fluid path between the secondary fluid vent and the outer circumference of the edge of the upper portion of the enlarged-diameter segment, and the tertiary variable restrictor forms a small fluid path with the groove. In this case as well, the groove need not be formed on the valve plug, but can be formed in the axial direction on the inner surface of the valve seat.

In the device of this invention, all restrictors to regulate the flow of brake fluid are variable restrictors, and should contaminants become lodged inside any restrictor, the variable movement of the restrictor will forcefully remove the contaminants to prevent clogging of the fluid path.

Moreover, the piston will not drop even when subjected to high pressure during sudden braking, thereby maintaining a large fluid path between the inlet port and the outlet port to ensure adequate braking pressure.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF THE PREFERRED EMBODIMENTS

EXAMPLE 1

A first embodiment of this invention is explained next with reference to the diagrams.

Figure 1:
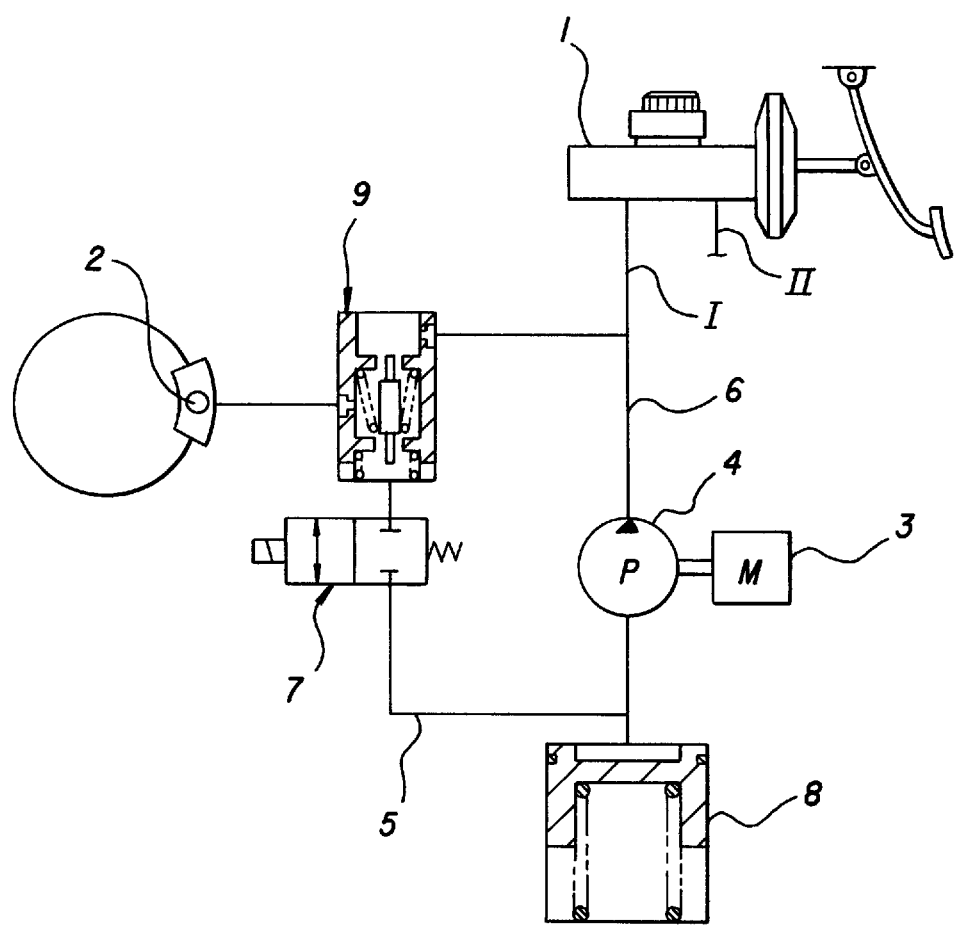
FIG. 1 illustrates a braking system having a brake pressure control device equipped with an ABS function according to the present invention.

FIG. 1 is a conceptual diagram of the overall configuration of a brake pressure control device equipped with an ABS function according to the present invention.

The master cylinder I as the pressure-generating source and the wheel cylinders 2 of the wheel brakes are connected by two main brake lines 1, II. The connections between the master cylinder and the rear-left, rear-right, front-left, and front-right wheels can be split into two diagonal brake circuits, or into a front brake circuit and a rear brake circuit as is conventional.

An exhaust line 5 is connected to the main brake line I from the master cylinder side to the suction side of the hydraulic pump 4 (an auxiliary hydraulic pressure source), which is interlocked with and driven by motor 3. A delivery line 6 is connected from the discharge side of the hydraulic pump to the main brake line 1. A normally-closed, electromagnetically actuated exhaust valve 7 and an auxiliary reservoir 8 are provided in the exhaust line 5. A normally-open, hydraulically-actuated flow control valve 9 is provided at the point of branching of the exhaust line 5 from the main brake line I. Each wheel is equipped with a speed sensor of a known type, (omitted from the diagram) that detects the speed of the wheel. Each sensor is connected to a known type of electronic module, also not shown in the diagram. The electronic module transmits electrical control signals to the motor 3 and exhaust valve 7 if a potential skid is detected in any wheel.

Figure 2:
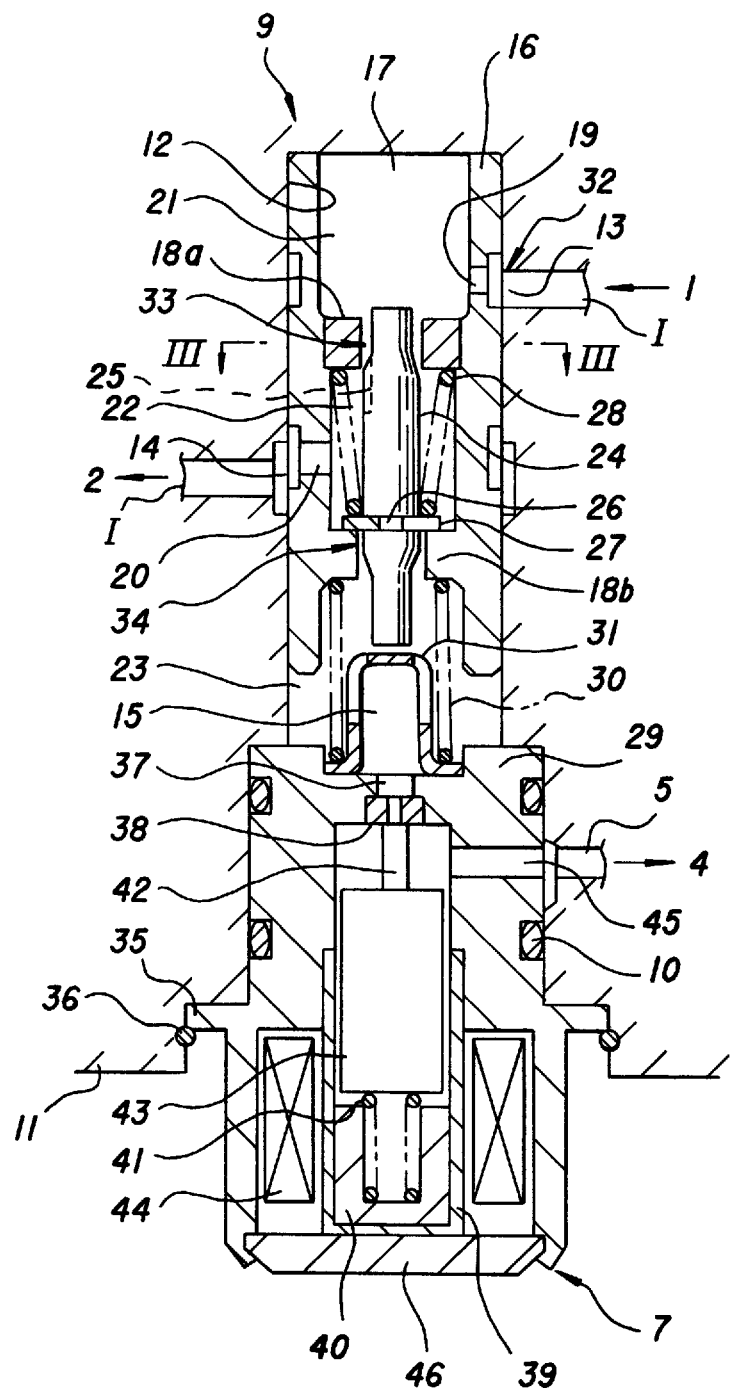
FIG. 2 is a cross section diagram of the exhaust valve and flow control valve assembled into one integral unit.

FIG. 2 is a cross section diagram of the exhaust valve 7 and flow control valve 9 assembled into an integrated body, which is in a non-operating state.

Housing 11 has one or more cavities 12 of variable diameter which house the exhaust valve 7 and the flow control valve 9 in series. An inlet port 13 and outlet port 14 are provided in sequence from the closed end of the cavity 12 wherein the inlet port has passage to the master cylinder side of the main brake line I and the outlet port has passage to the wheel cylinder side of the main brake line. An exhaust port 15 is provided on the opening side of the cavity 12, and has passage to the exhaust line 5 via the exhaust valve 7.

A cylindrical piston 16 with a through-hole 17 is housed to slide within cavity 12. A secondary valve seat 18b and a primary valve seat 18a, are provided in the through-hole 17 and are separated at a prescribed distance inside the through-hole 17. The secondary valve seat 18b is provided in the form of an annular protuberance integrally formed as part of piston 16. The primary valve seat 18a is a annular bushing affixed to the through-hole 17. As well, a primary fluid vent 19 and a secondary fluid vent 20 respectively are bored through the piston in the radial direction on either side of the primary valve seat 18a and connect to respective annular grooves in the outer periphery of the piston 16.

An inlet chamber 21, an outlet chamber 22, and a pressure reduction chamber 23 are formed in sequence from the closed end of the cavity 12 within the space enclosed by the cavity 12, the piston 16, and the exhaust valve 7. The primary fluid vent 19 enables passage between the inlet port 13 and inlet chamber 21 while the secondary fluid vent 20 enables passage between the outlet port 14 and outlet chamber 22.

Figure 3:
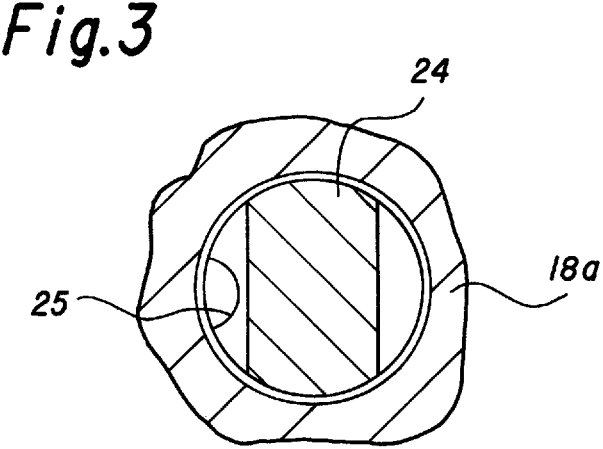
FIG. 3 is a cross section diagram of that portion of the integrated valve unit of FIG. 2 between the symbols III—III, and illustrates the shape of the fluid path that can be formed in the valve plug.

The valve plug 24 is a column-like component of virtually the same diameter as the inner diameter of primary valve seat 18a and secondary valve seat 18b. A thin peripheral layer is trimmed off the upper and lower ends of the valve plug, thereby enabling it to move in the axial direction through the primary valve seat 18a and secondary valve seat 18b (see FIG. 3). Also, one or more grooves 25 are formed in the axial direction along the outer circumference of the upper portion of the valve plug 24. The groove 25 can be arc-shaped in cross section as shown in FIG. 3, or can be formed in other cross sectional formats such as a V or a square. This groove 25 forms the small fluid path, to be described later, the cross section area of which is to allow passage of a prescribed amount of fluid flow.

A C-shaped retaining ring 27 is at all times mounted in the peripheral groove 26 of valve plug 24 and abuts against the upper face of secondary valve seat 18b to fix the position to which the valve plug 24 drops relative to the piston 16. There is passage between the outlet chamber 22 and pressure reduction chamber 23, and normally, a small fluid path is formed between the inner surface of the secondary valve seat 18b and the outer circumference of the valve plug 24. The spring 28 is compressed between the bottom face of the primary valve seat 18a of piston 16 and the upper face of the retaining ring 27. The restoring forces of the spring 28 pushes the valve plug 24 towards the cavity opening, i.e. the pressure reduction chamber 23.

In addition, the exhaust valve 7 seals the cavity 12. Return spring 30 is compressed between the valve body 29 of the exhaust valve 7 and the secondary valve seat 18b. The restoring forces of the return spring 30 pushes the piston 16 towards the closed end of the cavity, i.e. the inlet chamber 21. The spring force of the return spring 30 is set to be greater than that of the spring 28.

A sleeve 31 with slit is provided on the top face of valve body 29 and limits the position to which the valve plug 24 drops relative to the cavity 12. The sleeve 31 is not required if that portion of the bottom of the valve plug 24 extending below the secondary valve seat 18b is made equal and-only equal to the height of the sleeve 31. If the sleeve is used, the bottom of the return spring 30 can be set to push against the cuff of the sleeve 31. This will enable the sleeve 31 to be mounted onto the valve body 29 without welding or screwing.

The housing 11 and piston 16 should preferably be made from materials which have the same thermal coefficient of expansion. Otherwise, temperature variations will cause the clearance between the inner surface of the cavity 12 and the outer circumference of the piston 16 to fluctuate, in which case, the airtight seal between the two components could be lost or the piston 16 could be immobilized. An aluminum alloy is the preferred material for both the housing 11 and piston 16, but other materials can be used.

As well, the primary valve seat 18a and the valve plug 24 of the secondary variable restrictor 33, to be described later, should preferably be made of materials having the same thermal coefficient of expansion. The degree of constriction of the secondary variable restrictor 33 is the main determinant factor of the flow characteristics of the flow control valve 9. Hence, using materials having the same thermal coefficient of expansion will minimize the fluctuations with temperature changes in the cross section area of the fluid path in the constricted state. Steel is the preferred material for both the primary valve seat 18a and valve plug 24, but other materials can be used.

As shown in FIG. 2, a primary variable restrictor 32, a secondary variable restrictor 33, and a tertiary variable restrictor 34 are formed in series between the cavity 12, the piston 16, and the valve plug 24.

The primary variable restrictor 32 is formed between the inlet port 13 and the annular groove of the primary fluid vent 19 of piston 16, and the cross section area of its fluid path changes as the piston 16 moves relative to the cavity 12. The secondary variable restrictor 33 is formed between the primary valve seat 18a and the upper portion of valve plug 24, and the cross sectional area of its fluid path changes as the piston 16 and valve plug 24 move relative to each other. During a control action, the secondary variable restrictor 33 forms a small fluid path with the groove 25; during normal braking, a large fluid path is formed between the inner surface of the primary valve seat 18a and the outer circumference of the valve body 24. The tertiary variable restrictor 34 is formed between the secondary valve seat 18b and the lower portion of the valve plug 24, and the cross sectional area of its fluid path also changes as the piston 16 and valve plug 24 move relative to each other. During a control action, the tertiary variable restrictor 34 forms a large fluid path between the inner surface of the secondary valve seat 18b and the outer circumference of the valve body 24; during normal braking, a small fluid path is formed between the inner surface of the secondary valve seat 18b and the outer circumference of the valve body 24.

The configuration of this invention differs from conventional devices as follows: The primary variable restrictor 32, the secondary variable restrictor 33, and the tertiary variable restrictor 34, formed between the cavity 12, piston 16, and valve plug 24 which move relative to each other, are arranged in series in the fluid path between the inlet port 13 with passage to the pressure-generating source and exhaust port 15 with passage to the exhaust valve 7. A fluid path through outlet port 14 with passage to a wheel brake is connected between the secondary variable restrictor 33 and the tertiary variable restrictor 34. A groove forming a small fluid path is formed on the upper portion of the valve plug 24.

The exhaust valve 7, shown in FIG. 2, is of a known solenoid valve type, mounted so as to be undetachable in the opening of the cavity 12 of the housing 11 by a retaining ring 36 provided on the outer side of flange 35 of the valve body 29. A duct 37 with passage to the pressure reduction chamber 23 is formed in the center of the valve body 29. A tertiary valve seat 38 is provided below the duct 37. The exhaust valve 7 includes a dome-shaped sleeve 39, a magnet core 40, exhaust valve spring 41, an armature assembly formed of the armature 43 as an integral unit with the exhaust valve plug 42, and a coil 44 wound around the exterior of sleeve 39.

When the coil 44 is de-energized, the restoring forces of the exhaust valve springs 41 push the exhaust valve plug 42 into the tertiary valve seat 38, thereby blocking passage between the pressure reduction chamber 23 and the exhaust line 5. If the coil 44 is energized, an electromagnetic force acts on the armature 43, whereupon the exhaust valve plug 42 separates from the tertiary valve seat 38 to restore passage between the pressure reduction chamber 23 and the exhaust line 5. The spring force of the exhaust valve spring 41 is set to be larger than the hydraulic pressure acting in the direction to open the exhaust valve plug 42 when the exhaust valve 7 is in the de-energized state.

As shown in FIG. 2, the exhaust valve also includes a seal 10 mounted on the valve body 29, a duct 45 bored through the valve body, and a yoke ring 46 which forms part of the electromagnetic circuit and which also closes the lower opening of the valve body 29.

The action of the brake pressure control device is explained with reference to the appended diagrams.

1. Normal braking (no specific control action)

FIG. 2 illustrates the state of the brake pressure control device when the driver presses the brake pedal and no skidding of the wheels is detected (no specific control required). In this case, the exhaust valve 7 is de-energized, hence the exhaust valve mechanism is closed, and the pump as well, remains inactivated. The piston 16, receiving the spring force of the return spring 30, is pushed towards the closed end of cavity 12, wherein the cross section area of the fluid path of the primary variable restrictor 32 is maintained at its largest value. As well, since valve plug 24 is pushed downwards by the spring 28, the cross section area of the fluid path of the secondary variable restrictor 33 is also maintained at its largest area, while the cross-section area of the fluid path of the tertiary variable restrictor 34 is constricted. Accordingly, the brake pressure generated at the master cylinder is supplied to the wheel cylinder via a large fluid path composed of the main brake line I, inlet port 13, primary fluid vent 19, inlet chamber 21, outlet chamber 22, secondary fluid vent 20, and outlet port 14.

2. Control action (pressure reduction)

Figure 4:
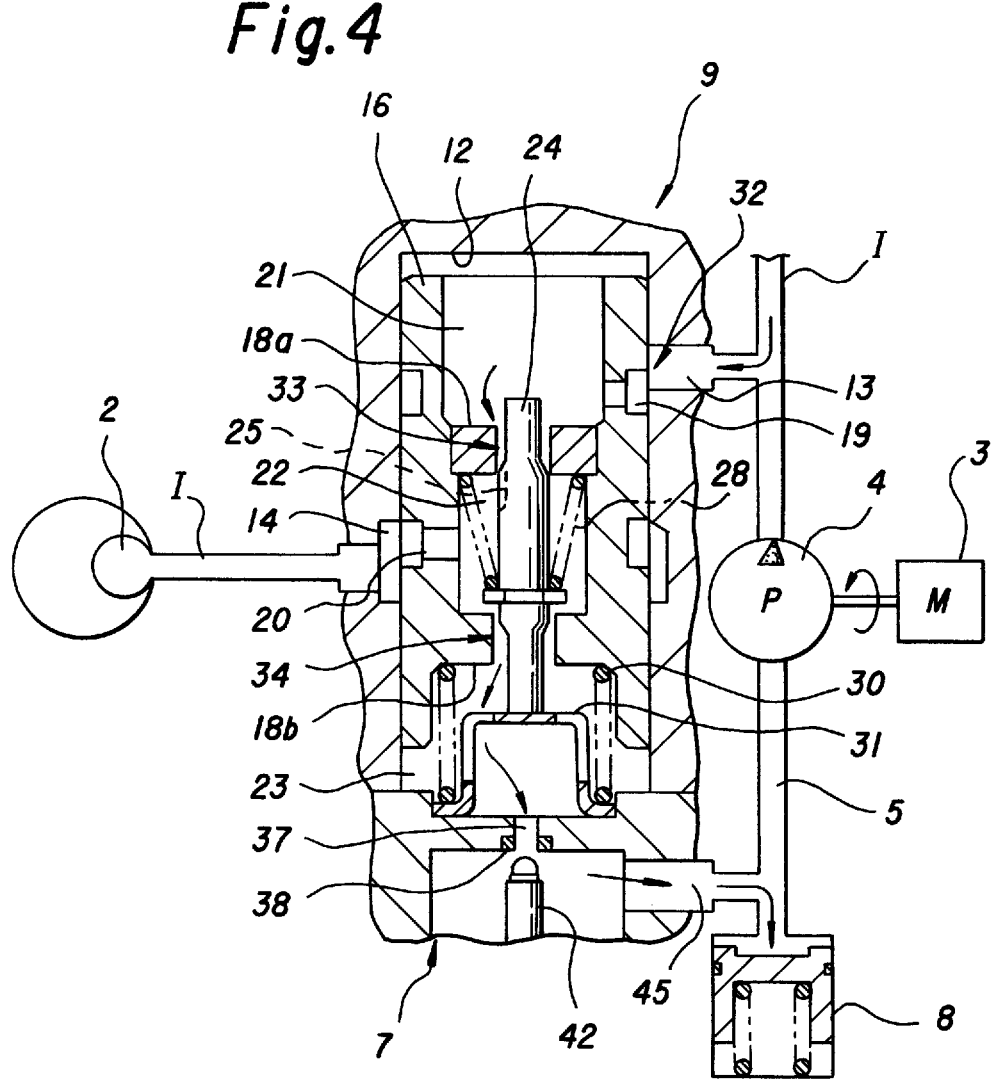
FIG. 4 is a conceptual diagram of a portion of the brake pressure control device, illustrating its action immediately after the start of ABS control.
Figure 5:
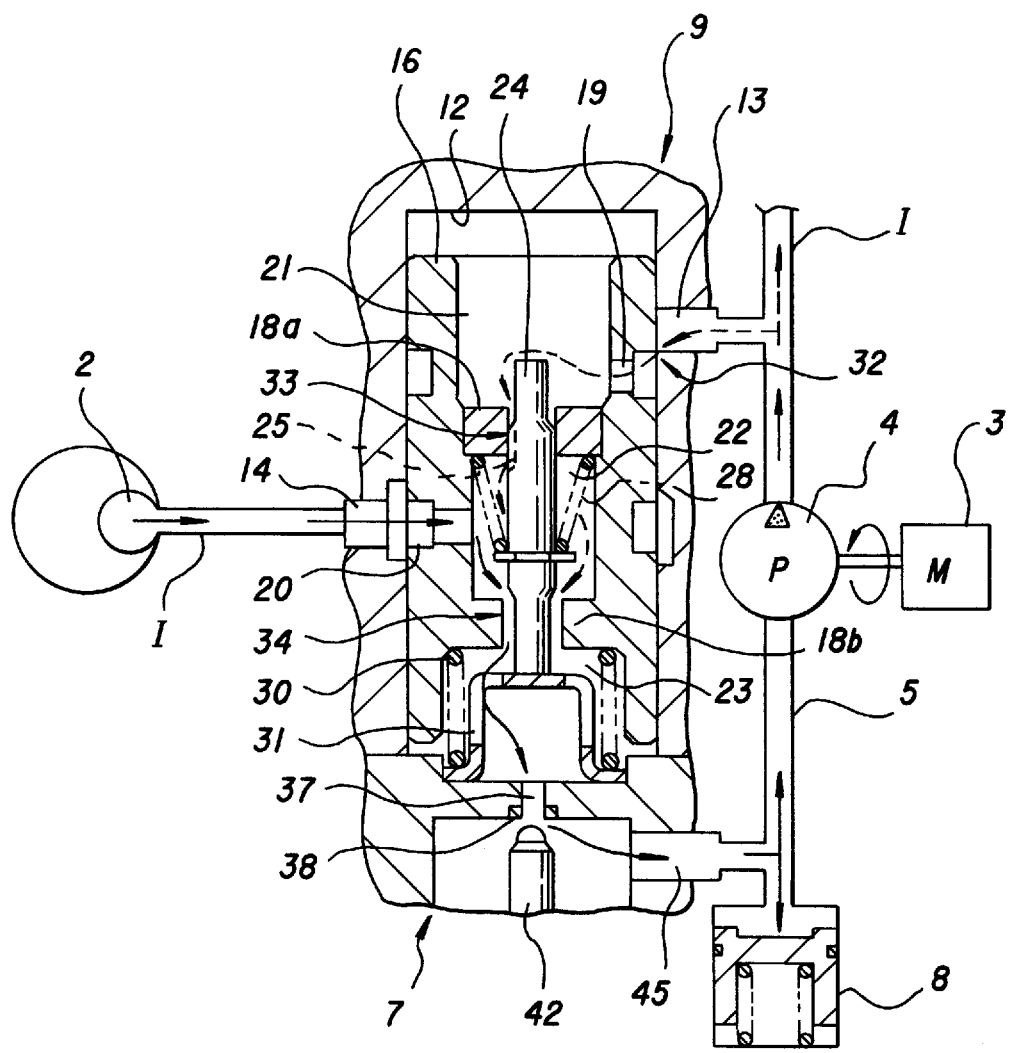
FIG. 5 is a conceptual diagram of a portion of the brake pressure control device, illustrating its action when the controlled brake pressure is reduced.

FIG. 4 and FIG. 5 are conceptual diagrams illustrating the action when an impending skid of a wheel is detected, wherein ABS action starts, and brake pressure is reduced. First, the exhaust valve 7 is energized and switches from the closed to the open state, thereby opening a passage through the pressure reduction chamber 23 and exhaust line 5. At the same time, the motor 3 drives the pump 4.

Constriction of the tertiary variable restrictor 34, which forms a small fluid path, enables hydraulic pressure in the inlet chamber 21 to cause the piston 16 to move towards the pressure reduction chamber 23 (drops downward in the diagram), while compressing the return spring 30. Meanwhile, the valve plug 24 receives the spring force of the spring 28 and moves in tandem with the piston 16. Ultimately, the valve plug 24 comes to a halt as it abuts sleeve 31, while piston 16 continues to move.

As shown in FIG. 4, when only the piston 16 is moving and the valve plug 24 has halted, the secondary variable restrictor 33 switches from the non-constricted to the constricted state to reduce the area of the fluid path. That is, the pressure medium will only pass through the small path of the groove 25 of the secondary variable restrictor 33. Another design possibility would be to set the diameter of the valve plug 24 and the diameter of primary valve seat 18a so as to create a cylindrical gap between the outer circumference of the valve plug and the inner surface of the valve seat, then use the cylindrical gap as the small fluid path. However this would enlarge the contact area of the pressure medium, thereby increasing flow resistance, causing greater fluctuations in fluid flow with changes in the viscosity of the pressure medium. This raises the concerns of a difficulty in controlling the pressure and the inability to achieve satisfactory braking control. In contrast, the use of the groove 25 as the small fluid path diminishes the contact area of the pressure medium as well as reducing flow resistance, thereby minimizing fluctuations in fluid flow with changes in viscosity of the pressure medium. This facilitates pressure control, thus enabling satisfactory braking control.

Next, the tertiary variable restrictor 34 switches from the constricted to the non-constricted state. As a result, brake fluid in the wheel cylinder 2 is exhausted to the exhaust line 5 via the main brake line I, outlet port 14, secondary fluid vent 20, outlet chamber 22, tertiary variable restrictor 34, pressure reduction chamber 23, and ducts 37 and 45. This reduces the pressure of the wheel cylinder 2. Fluid exhausted to the exhaust line 5 is temporarily stored in the auxiliary reservoir 8, or is cycled back to the main brake line I through the pump 4.

Meanwhile, as shown in FIG. 5, movement of the piston 16 temporarily blocks passage between the inlet port 13 and primary fluid vent 19, which forms the primary variable restrictor 32. Subsequently however, the piston 16 moves back and forth repeatedly over an extremely short range to open and close the primary variable restrictor 32, wherein brake fluid flows from the master cylinder side at a fixed flow into the outlet chamber 22 via the inlet chamber 21. The fluid is then exhausted to the exhaust line 5 via the exhaust valve 7, which is in the open state as described previously.

3. During pressure increase

Figure 6:
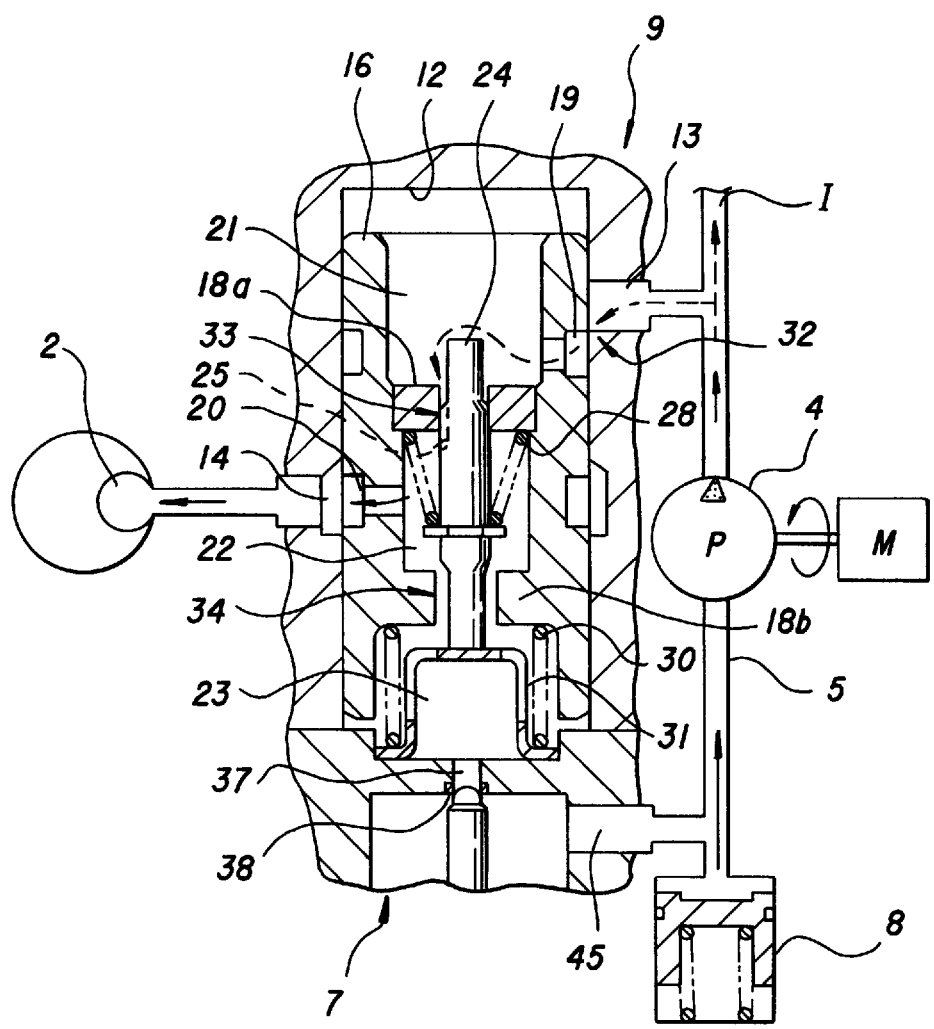
FIG. 6 is a conceptual diagram of a portion of the brake pressure control device, illustrating its action when the controlled brake pressure is increased.

As ABS action switches to the pressure increase mode, as shown in FIG. 6, the exhaust valve 7 closes to block passage of fluid between the pressure reduction chamber 23 and the exhaust line 5, thereby stopping the pressure decrease in the wheel cylinder 2. Although the exhaust valve 7 closes, the primary variable restrictor 32 and secondary variable restrictor 33 remain constricted, wherein fluid cycled from the pump 4 to the main brake line I is adjusted to a prescribed flow as it passes through the variable restrictors. The fluid is then supplied to the wheel cylinder 2, wherein the brake pressure rises very slightly.

Next, the flow control action by each variable restrictor is explained.

When the piston 16 drops and blocks passage between the inlet port 13 and primary fluid vent 19, the flow of brake fluid stops, wherein the equilibrium state of the forces acting upward and downward on the piston 16 can be derived from Formula 1 as follows: Formula 1

$$P_1 \cdot A = P_2 \cdot A + F_1 + F_2$$

where A=Pressure-subjected area of piston 16
F$_1$=Spring force of return spring 30
F$_2$=Spring force of spring 28
P$_1$=Pressure of inlet chamber 21
P$_2$=Pressure of outlet chamber 22 (wheel cylinder 2, pressure reduction chamber 23)

From Formula 1, the pressure difference ΔP, a prescribed value, between P$_1$ and P$_2$ is described by Formula 2.
Formula 2:

$$\Delta P = \frac{(F_1 + F_2)}{A}$$

That is, the primary variable restrictor 32 closes when the pressure of inlet chamber 21 becomes higher than the pressure of outlet chamber 22 by a prescribed value, ΔP.

When the primary variable restrictor 32 closes and the flow of brake fluid from the inlet port 13 to the inlet chamber 21 stops, there is still a connection between the inlet chamber 21 and the outlet chamber 22 via the secondary variable restrictor 33. Therefore the pressure difference between the inlet chamber and the outlet chamber becomes smaller than the prescribed value described previously; that is (P$_1$−P$_2$<ΔP). Accordingly, the upward and downward forces acting on piston 16 at this time is expressed by Formula 3.
Formula 3:

$$P_1 \cdot A < P_2 \cdot A + F_1 + F_2$$

In other words, when the primary variable restrictor 32 closes, the force pushing the piston 16 upwards (i.e. the right side of Formula 3) becomes greater than the force pushing the piston 16 downwards (i.e. the left side of Formula 3), wherein the piston moves up, the primary variable restrictor 32 opens, and brake fluid flows from the inlet port 13 into the inlet chamber 21. At this point, the constriction of the secondary variable restrictor 33 increases the pressure difference between the inlet chamber 21 and the outlet chamber 22, causing the piston 16 to move downwards. Subsequently, the primary variable restrictor 32 closes when the pressure difference (P$_1$–P$_2$) of the inlet chamber and the outlet chamber reaches the prescribed value ΔP.

The piston 16 repeatedly moves back and forth in this manner to open and close the primary variable restrictor 32, wherein brake fluid is supplied from the inlet port 13 to the wheel brake at a prescribed flow.

When the difference between the pressure of the inlet port 13 (master cylinder 1) and the pressure of the outlet chamber 22 (wheel cylinder 2) becomes less than the prescribed value ΔP, the piston 16 moves upward with the spring force of return spring 30 and spring 28, and the valve returns to the non-control state of FIG. 2.

EXAMPLE 2

Figure 7:
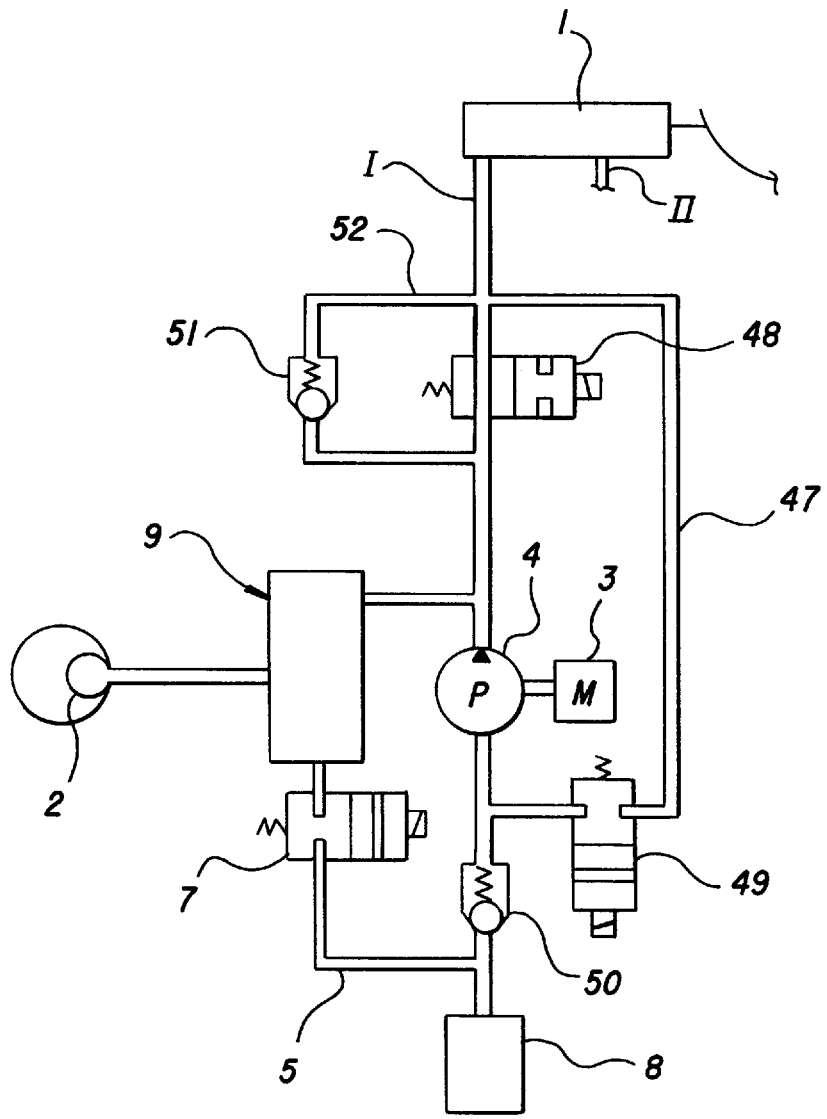
FIG. 7 illustrates a braking system configured with a brake pressure control device equipped with both an ABS function and TCS function.

FIG. 7 illustrates another embodiment of the brake pressure control device equipped with a dual ABS and TCS function. The basic structural elements and action of this embodiment are the same as that of the Example 1. Accordingly, the structural elements have been designated with the same symbols as for the Example 1, and an explanation thereof is omitted here.

This embodiment differs from that of Example 1 as follows.

(a) A suction line 47 has been added connecting the main brake line I to the exhaust line 5 on the suction side of the pump 4.

(b) A normally-open solenoid valve 48, for traction control, is provided downstream of the point of confluence of the main brake line I and the suction line 47.

(c) A normally-closed solenoid valve 49, for traction control, is provided in suction line 47.

(d) A one-way valve 50 that allows brake fluid to only flow towards the hydraulic pump 4 is provided upstream of the point of confluence of the exhaust line 5 and the suction line 47.

(e) A by-pass line 52, having a relief valve 51 is connected from either side of the solenoid valve 48 to the main brake line I.

The action of the brake pressure control device as embodied in Example 2 is explained next.

1. Normal braking (no specific control)

As shown in FIG. 7, during normal braking, none of the control elements are energized; therefore solenoid valve 48 is open, and solenoid valve 49 is closed.

The action of the device during normal braking when there is no specific control function is the same as for the embodiment of Example 1, and an explanation thereof is omitted.

2. During ABS control During ABS control, solenoid valve 48 is open, and solenoid valve 49 is closed. Otherwise, all other actions are the same as for the embodiment of Example 1; hence an explanation thereof is omitted here.

3. During TCS control During TCS control, solenoid valve 48 switches to the closed state and simultaneously solenoid valve 49 switches open, and pump 4 is activated. The pump 4 draws in brake fluid through the suction line 47, transmits it through the flow control valve 9, which is in the non-operating state, to the wheel cylinder 2 to control the spinning of the drive wheels. When spinning is controlled, the exhaust valve 7 opens to reduce the brake pressure. At this point, the flow control valve 9 starts to reduce the pressure by the same action as described previously for Example 1. Subsequently, the exhaust valve 7 repeatedly closes and opens to increase or decrease the brake pressure of the drive wheels to control their spinning.

During TCS control, the solenoid valve 48 remains closed to prevent brake fluid discharged from the pump 4 from flowing to the master cylinder 1. Excess fluid discharged thereof is exhausted to the master cylinder 1 side via the relief valve 51.

EXAMPLE 3

Figure 8:
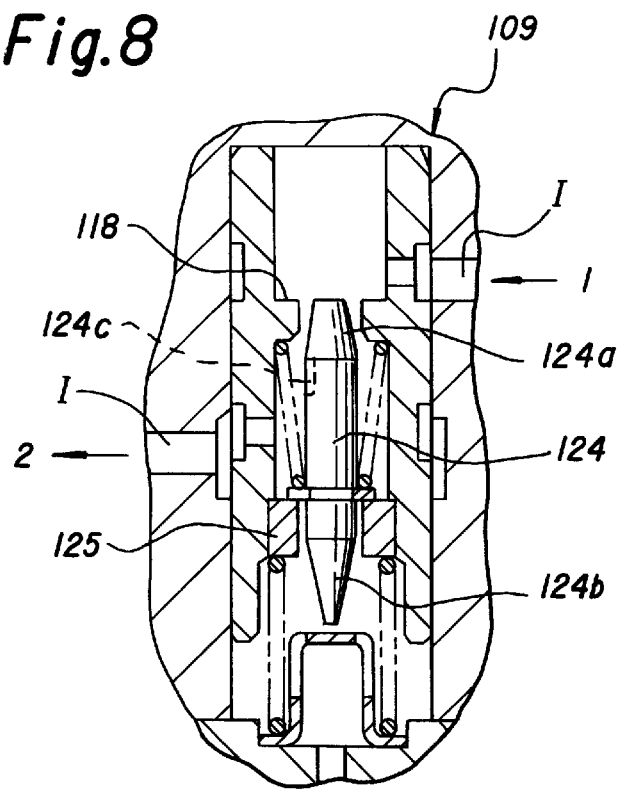
FIG. 8 is a partial cross section diagram of the exhaust valve and flow control valve assembled into one integrated unit, and illustrates an embodiment of the brake pressure control device in which the valve plug of the flow control valve is needle-shaped.

FIG. 8 illustrates another embodiment of the brake pressure control device, in which at least one of the ends 124a or 124b of valve plug 124 in the flow control valve 109 is needle-shaped. In this case as well, a groove 124c is set in the axial direction on the outer circumference of the upper portion of the valve plug 124. Also, the primary valve seat 118 can be integrally formed, and a bushing can be affixed to form the secondary valve seat 125.

EXAMPLE 4

Figure 9:
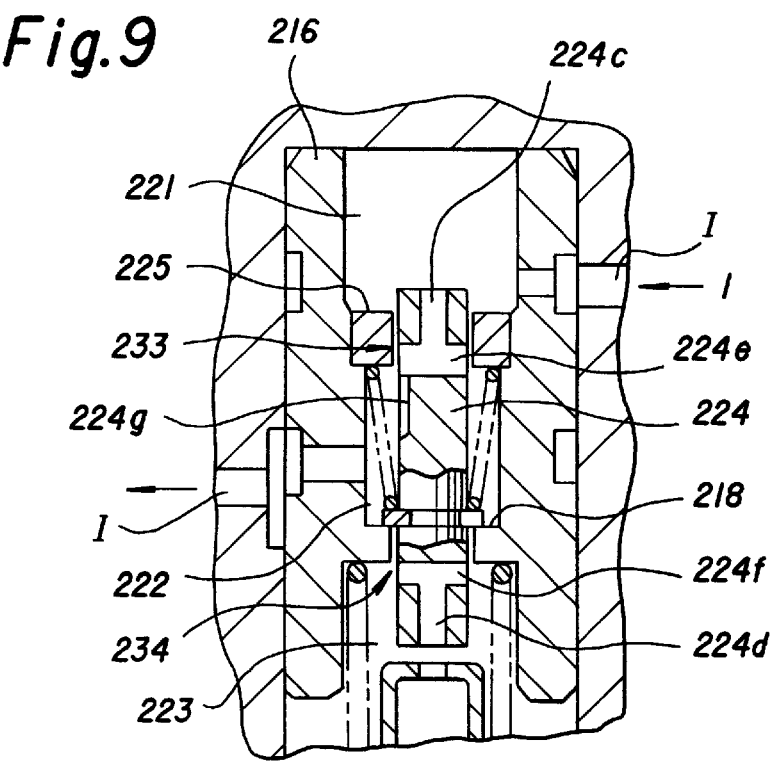
FIG. 9 is a partial cross section diagram of the exhaust valve and flow control valve assembled into one integrated unit, and illustrates an embodiment of the brake pressure control device in which fluid ducts are provided inside the valve plug.

FIG. 9 illustrates another embodiment of the brake pressure control device in which fluid ducts are formed inside the valve plug 224. Axial ducts 224c, 224d and radial ducts 224e, 224f, provided in the radial direction with connection to the axial ducts 224c, 224d respectively are bored inside the upper and lower segment respectively of the cylindrical valve plug 224. Axial duct 224c and radial duct 224e form a fluid path for passage between the inlet chamber 221 and outlet chamber 222. Axial duct 224d and radial duct 224f form a fluid path for passage between the outlet chamber 222 and pressure reduction chamber 223. In addition, a groove 224g is formed in the axial direction along the outer circumference of the valve plug 224 so as to connect with the radial duct 224e and the upper end of the valve plug 224.

With this configuration, a secondary variable restrictor 233 is formed between the radial duct 224e and primary valve seat 225. A tertiary variable restrictor 234 is formed between the radial duct 224f and secondary valve seat 218. For the secondary variable restrictor 233, during a control operation, a small fluid path is formed by the groove 224g, and during normal braking, a large fluid path is formed by the radial duct 224e.

EXAMPLE 5

Figure 10:
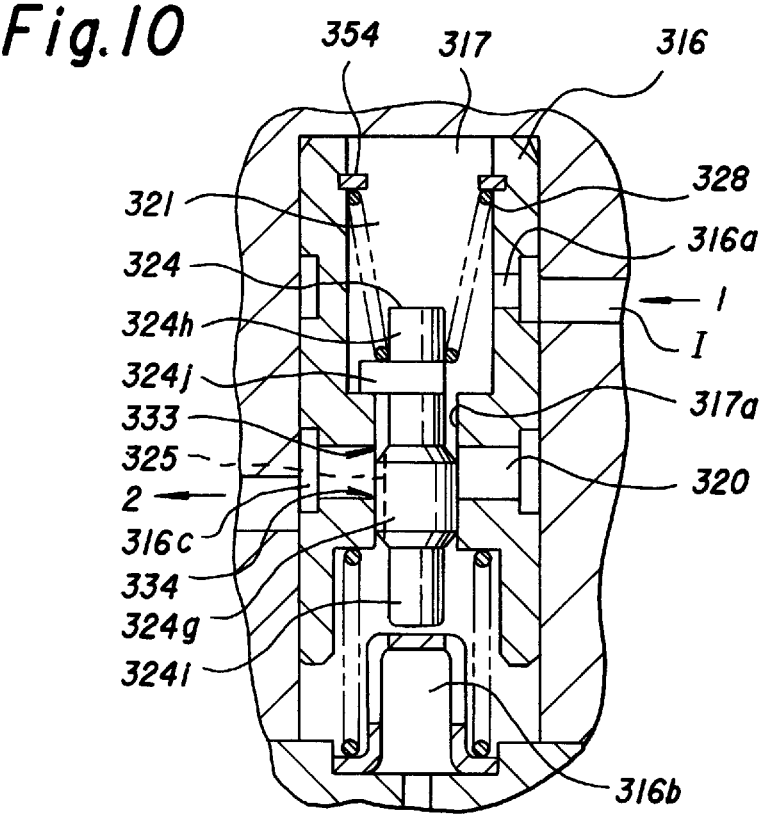
FIG. 10 is a partial cross section diagram of the exhaust valve and flow control valve assembled into one integrated unit, and illustrates an embodiment of the brake pressure control device in which a secondary variable restrictor and a tertiary variable restrictor are formed by the valve seat and the enlarged-diameter segment of the valve plug.

As shown in FIG. 10, the piston 316 is configured such that a annular valve seat 317a is provided inside the through-hole 317 between the primary fluid vent 316a and the exhaust outlet 316b. A secondary fluid vent 320 is formed in the radial direction on the valve seat 317a to enable connection between the outlet port 316c and the through-hole 317. The valve plug 324 includes a central enlarged-diameter segment 324g which is movable in the axial direction inside the valve seat 317a, and small-diameter segments 324h, 324i formed on either side thereof. A groove 325 is provided in the axial direction along the outer circumference of the large-diameter segment 324g.

A stopper 324j protrudes around a portion of the small-diameter component 324h of the valve body 324 on the side of the inlet chamber 321. Spring 328 is positioned between the upper face of the stopper 324j and a retaining ring 354 set in the piston 316. The valve plug 324, which receives the spring force of the spring 328, is positioned such that the lower face of the stopper 324j abuts the bottom face of the inlet chamber 321 of piston 316.

With this configuration, the secondary variable restrictor 333 is formed by the edge of the upper portion of the enlarged-diameter segment 324g of the valve plug and the valve seat 317a; and the tertiary variable restrictor 334 is formed by the edge of the lower portion of the enlarged-diameter segment 324g of the valve plug and the valve seat 317a. During a control operation, the secondary variable restrictor 333 forms a small fluid path with the groove 325, and the tertiary variable restrictor 334 forms a large fluid path between the secondary fluid vent 320 and the outer circumference of the lower portion of the enlarged-diameter segment 324g of the valve plug. During normal braking, the secondary variable restrictor 333 forms a large fluid path between the secondary fluid vent 320 and the outer circumference of the upper portion of the large-diameter component 324g of the valve plug, and the tertiary variable restrictor 334 forms a small fluid path with the groove 325.

EXAMPLE 6

Figure 11:
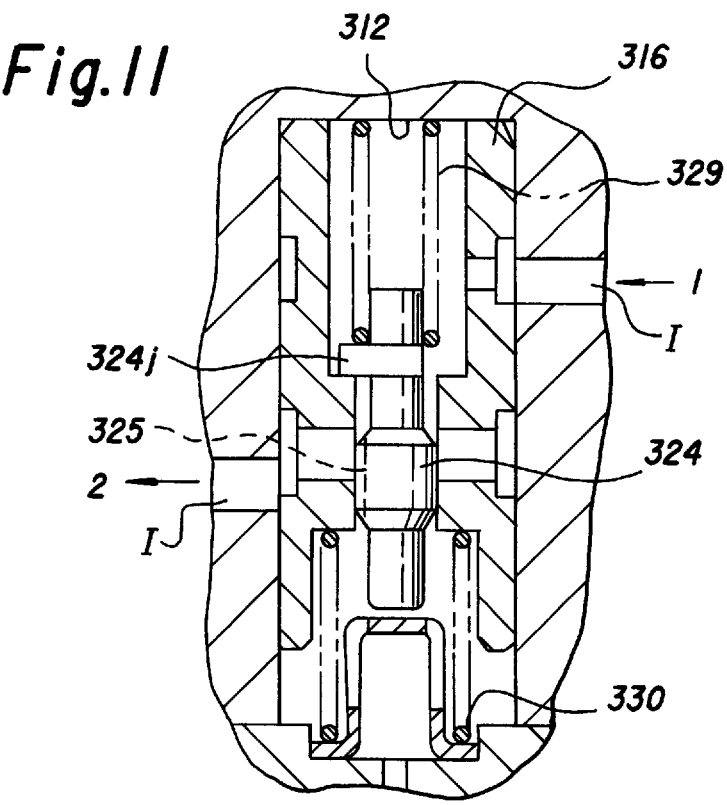
FIG. 11 is a partial cross section diagram of the exhaust valve and flow control valve assembled into one integrated unit, and illustrates an embodiment of the brake pressure control device in which springs are installed between the cavity and valve plug.

FIG. 11 illustrates another embodiment of the brake pressure control device in which spring 329 is set between the bottom (closed end) of the cavity 312 and the valve plug 324 of the stopper 324j. In this case, the retaining ring 354, as shown for Example 5 in FIG. 10, is not required. Moreover, during flow control, only the spring force of the return spring 330 acts on the valve plug 324. This facilitates the specification of a constant pressure difference, thereby controlling the flow more accurately.

EXAMPLE 7

Figure 12:
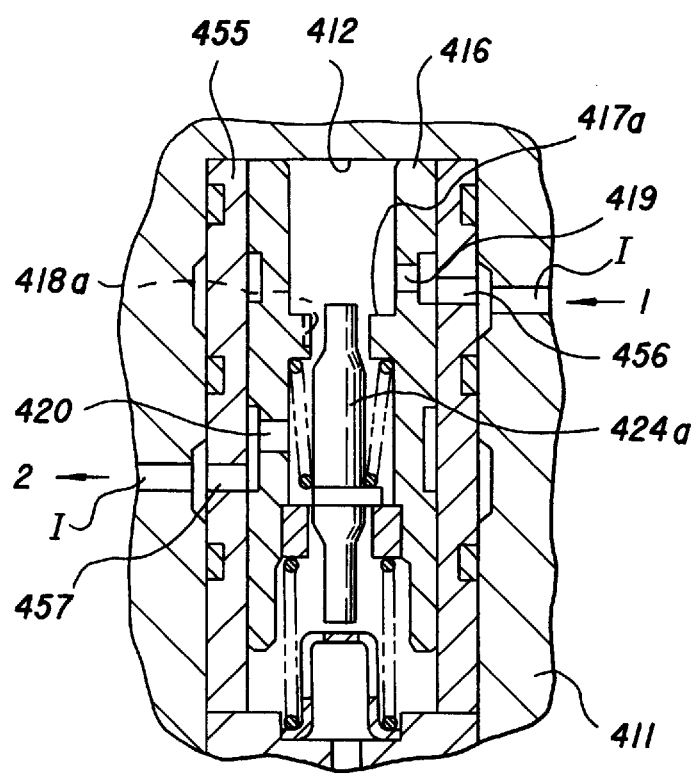
FIG. 12 is a partial cross section diagram of the exhaust valve and flow control valve assembled into one integrated unit, and illustrates an embodiment of the brake pressure control device in which a guide tube is inserted between the piston and the cavity.

In the previous examples, the piston is housed directly inside the cavity of the housing. However, as shown in FIG. 12, a guide tube 455 can be inserted between the piston 416 and the cavity 412 of the housing 411. The purpose of the guide tube 455 is to facilitate the fabrication of the cavity 412 by enabling it to be manufactured with greater tolerance. In this embodiment, fluid ducts 456, 457, corresponding to the inlet port and outlet port of the previous examples, are bored in the guide tube 455 in positions corresponding to the primary and secondary fluid vents 419, 420, and the primary variable restrictor is formed between the fluid vent 419 and fluid duct 456.

Instead of providing a groove on the upper portion of the valve plug 424a, a groove 418a can be formed on the inner surface of primary valve seat 417a of piston 416. This alternative configuration can be applied as well to any of the embodiments discussed above.

Figure 13A:
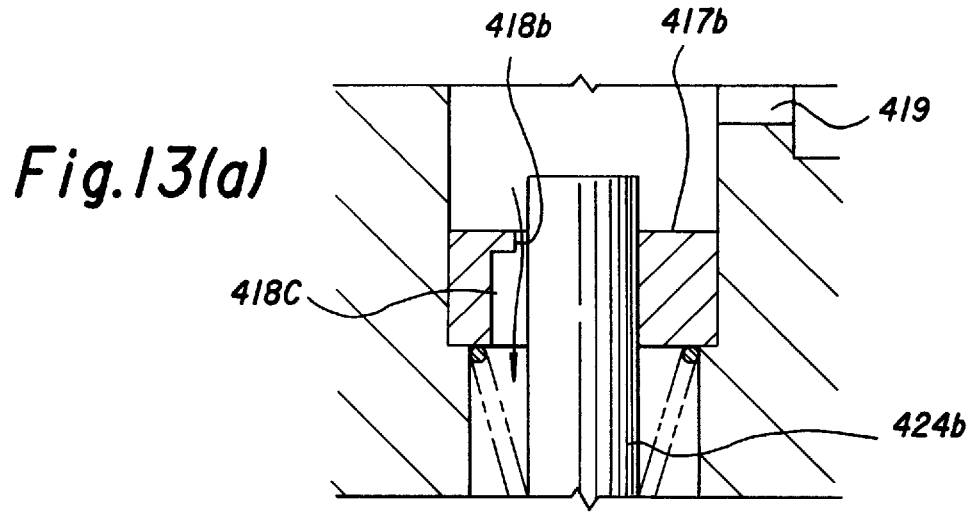
FIG. 13 illustrates an embodiment in which the groove is formed from a small groove and a large groove.
Figure 13B:
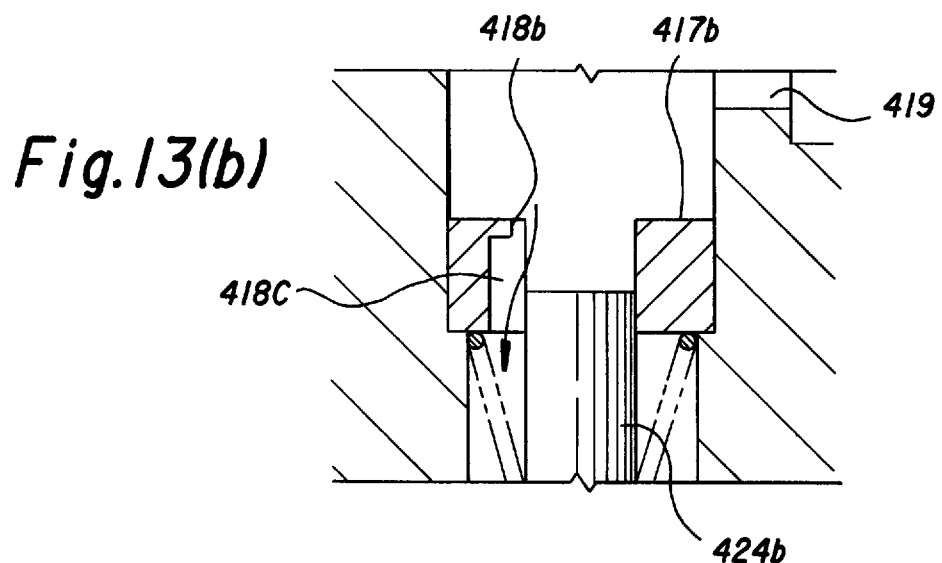
Figure 13C:
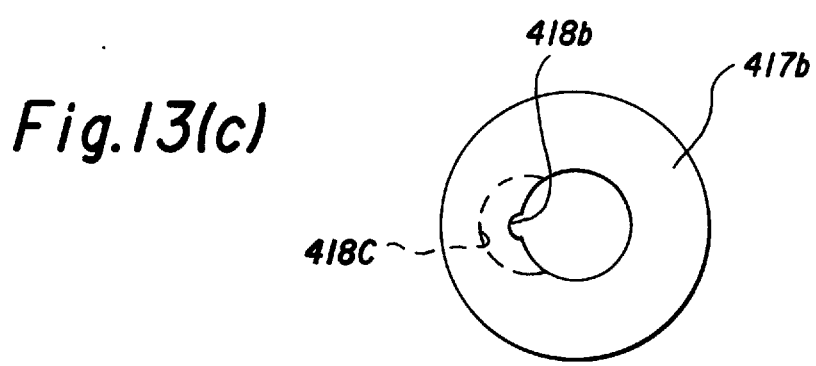
Figure 14:
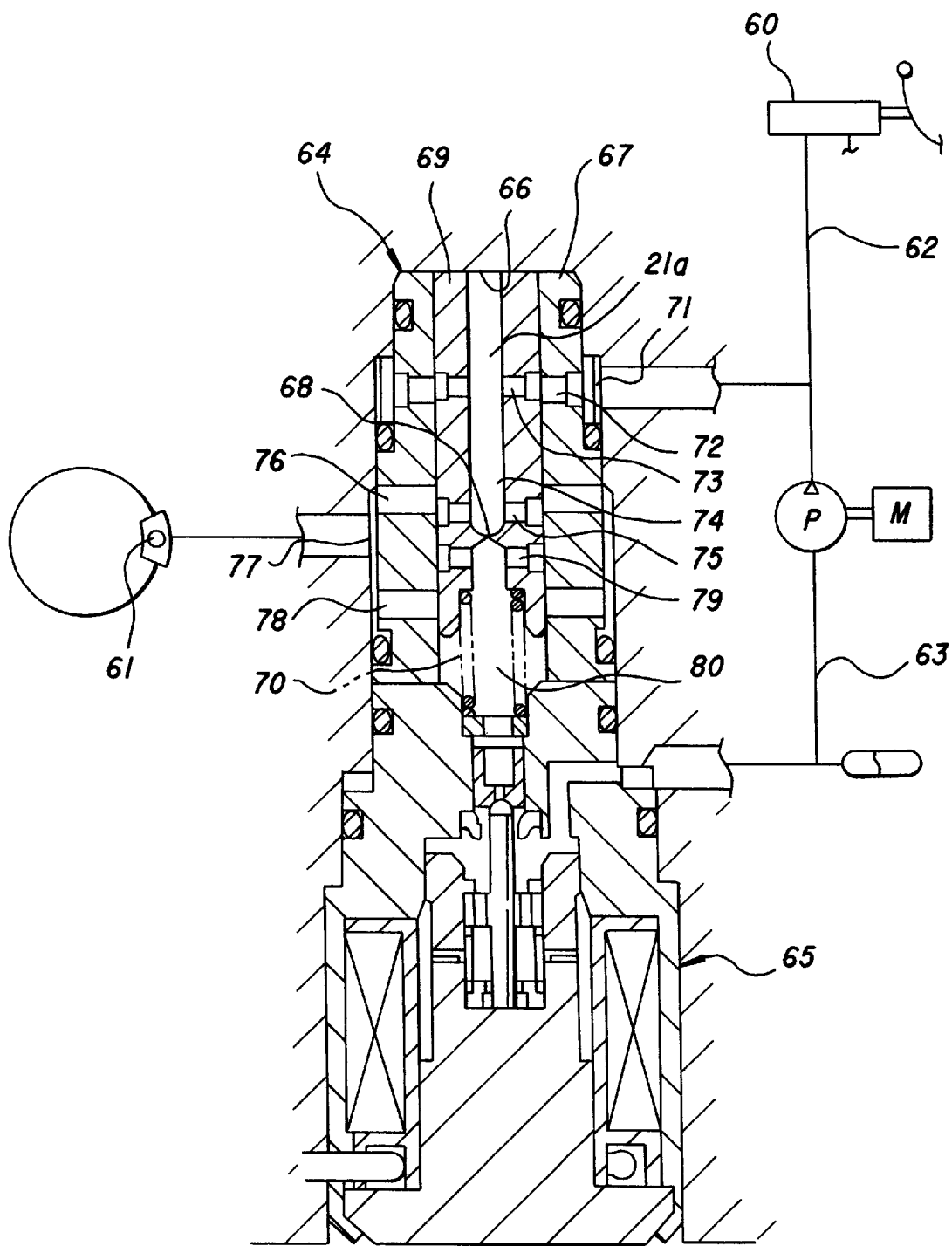
FIG. 14 is a conceptual diagram of a conventional brake pressure control device.

Also, as shown in FIGS. 13(a)–13(c), the groove formed on the inner surface of primary valve seat 417b can comprise a small groove portion 418b formed on the side of the primary fluid vent 419, and a large groove portion 418c formed on the side of the secondary fluid vent 420. Then, during a control operation, as shown in FIG. 13(a), a small fluid path through the small groove portion 418b is formed, and during normal braking, as shown in FIG. 13(b), a large fluid path through the large groove portion 418c is formed. This embodiment has the advantage that the upper portion of the valve plug 424b need only be a simple cylindrical rod, thus reducing the time required for its fabrication.

This invention offers certain particular advantages.

Firstly, all restrictors to vary the flow of brake fluid are variable restrictors in which the cross section diameter of the fluid path changes. That is, no orifices of fixed diameter are used. This variable constriction provides a self-cleaning action to prevent clogging of the fluid lines with contaminants and provides safer braking action.

Secondly, the use of a groove as the small fluid path diminishes the contact area of the pressure medium as well as reducing flow resistance, thereby minimizing fluctuations in fluid flow with changes in viscosity of the pressure medium. This facilitates pressure control, thus enabling satisfactory braking control.

Thirdly, a line to bypass connection between the inlet port and outlet port and connecting the pressure reduction chamber and a wheel brake is not required. This prevents brake fluid from being discharged from the pressure reduction chamber during sudden braking when the large pressure generated therein would act to push the piston towards the pressure reduction chamber. The piston therefore does not move, maintaining a large fluid path between the inlet port and outlet port to assure sufficient braking pressure, again providing more safety.

Fourthly, only two fluid ducts need be formed in the radial direction in the piston and cavity, thus reducing the number of fabrication steps.

Finally, only two radial fluid ducts are required in the cavity; moreover the relative position of the two ducts need not be manufactured to high precision. Thus the piston can be housed directly in the cavity of the housing, without the use of a guide tube. This makes for a smaller and lower-cost device.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What claim is:

1. A brake pressure control device comprising a main brake line connecting a pressure generating source to a wheel brake, an exhaust line branching off from the main brake line, a flow control valve that increases or decreases the brake pressure by a controlled ratio installed at point of the branching, and an exhaust valve that reduces the wheel brake pressure installed between said flow control valve and said exhaust line; wherein said flow control valve includes a housing having a cavity, a piston having a throughhole in the axial direction housed to slide inside the cavity and a valve plug housed to move in the axial direction within said throughhole, said housing further having an inlet port connected to the main brake line on a side of the pressure generating source, an outlet port connected to the main brake line on the wheel brake side, and an exhaust port connected to the exhaust valve, each port being open to said cavity, said piston has a primary fluid vent connecting between said inlet port and said through-hole, and a secondary fluid vent connecting between said outlet port and said through-hole, three variable restrictors are arranged in series, said three variable restrictors including a primary variable restrictor formed between said inlet port and said primary fluid vent and having a cross sectional area of a fluid path that changes with the movement of the piston to form a small fluid path during a control operation and a large fluid path during normal braking, a secondary variable restrictor formed between an annular primary valve seat extending from an inner surface of said through-hole between said primary fluid vent and said secondary fluid vent and an upper portion of said valve plug which passes through said primary valve seat, said secondary variable restrictor having a cross sectional area of a fluid path that changes with the relative movement of said piston and said valve plug such that during a control operation, a small fluid path is formed by a groove provided in the axial direction on an outer circumference of the valve plug, and during normal braking, a large fluid path is formed between the inner surface of said primary valve seat and the outer circumference of the valve plug, and a tertiary variable restrictor formed between an annular secondary valve seat extending from the inner surface of said through-hole on a side of said secondary fluid vent towards said exhaust port and a lower portion of the valve plug which passes through said secondary valve seat, said tertiary variable restrictor having a cross sectional area of a fluid path that changes with the relative movement of said piston and valve plug such that during a control operation, a large fluid path is formed between an inner surface of said secondary valve seat and the outer circumference of the valve plug, and during normal braking, a small fluid path is formed between the inner surface of said secondary valve seat and the outer circumference of the valve plug.

2. A brake pressure control device as claimed in claim 1, wherein an axial duct, and a radial duct connected thereto, are formed inside the upper portion of said valve plug, and said groove is formed in the axial direction on the outer circumference of the valve plug so as to connect with said radial duct, and the secondary variable restrictor is formed such that during a control operation, the small fluid path is formed with the groove, and during normal braking, the large fluid path is formed with said radial duct.

3. A brake pressure control device as claimed in claim 1, wherein said piston includes an annular valve seat extending from the inner surface of the through-hole between said primary fluid vent and the exhaust outlet, and a secondary fluid vent formed in the radial direction on said valve seat to connect between said outlet port and the through-hole, said valve plug has a central enlarged-diameter segment movable in the axial direction inside said valve seat, said groove is provided in the axial direction along the outer circumference of said enlarged-diameter segment, and the secondary variable restrictor is formed by an upper portion of said valve plug adjacent said enlarged-diameter segment and said valve seat, and the tertiary variable restrictor is formed by a lower portion of said valve plug adjacent said enlarged diameter segment and said valve seat, and during a control operation, the secondary variable restrictor forms the small fluid path with said groove, and the tertiary variable restrictor forms the large fluid path between said secondary fluid vent and the outer circumference of the lower portion of said valve plug, and during normal braking, the secondary variable restrictor forms the large fluid path between said secondary fluid vent and the outer circumference of the upper portion of said valve plug, and the tertiary variable restrictor forms the small fluid path with the groove.

4. A brake pressure control device comprising a main brake line connecting a pressure generating source to a wheel brake, an exhaust line branching off from the main brake line, a flow control valve that increases or decreases the brake pressure by a controlled ratio installed at point of the branching, and an exhaust valve that reduces the wheel brake pressure installed between said flow control valve and said exhaust line; wherein said flow control valve includes a housing having a cavity, a piston having a throughhole in the axial direction housed to slide inside the cavity and a valve plug housed to move in the axial direction within said throughhole, said housing further having an inlet port connected to the main brake line on a side of the pressure generating source, an outlet port connected to the main brake line on the wheel brake side, and an exhaust port connected to the exhaust valve, each port being open to said cavity, said piston has a primary fluid vent connecting between said inlet port and said through-hole, and a secondary fluid vent connecting between said outlet port and said through-hole, three variable restrictors are arranged in series, said three variable restrictors including a primary variable restrictor formed between said inlet port and said primary fluid vent and having a cross sectional area of a fluid path that changes with the movement of the piston to form a small fluid path during a control operation and a large fluid path during normal braking, a secondary variable restrictor formed between an annular primary valve seat extending from an inner surface of said through-hole between said primary fluid vent and said secondary fluid vent and an upper portion of said valve plug which passes through said primary valve seat, said secondary variable restrictor having a cross sectional area of a fluid path that changes with the relative movement of said piston and said valve plug such that during a control operation, a small fluid path is formed by a groove formed in the axial direction on an inner circumference of the primary valve seat, and during normal braking, a large fluid path is formed between the inner surface of said primary valve seat and an outer circumference of the valve plug, and a tertiary variable restrictor formed between an annular secondary valve seat extending from the inner surface of said through-hole on a side of said secondary fluid vent towards said exhaust port and a lower portion of the valve plug which passes through said secondary valve seat, said tertiary variable restrictor having a cross sectional area of a fluid path that changes with the relative movement of said piston and valve plug such that during a control operation, a large fluid path is formed between an inner surface of said secondary valve seat and the outer circumference of the valve plug, and during normal braking, a small fluid path is formed between the inner surface of said secondary valve seat and the outer circumference of the valve plug.

5. A brake pressure control device as claimed in claim 4, wherein said groove comprises a small groove portion formed on the primary fluid vent side and a large groove portion formed on the secondary fluid vent side.

6. A brake pressure control device as claimed in claim 4, wherein said piston includes an annular valve seat extending from the inner surface of the through-hole between said primary fluid vent and the exhaust outlet, and a secondary fluid vent formed in the radial direction on said valve seat to connect between said outlet port and the through-hole, said valve plug has a central enlarged-diameter segment movable in the axial direction inside said valve seat, said groove is formed in the axial direction along the inner surface of the through-hole between said primary fluid vent and the outlet port, and the secondary variable restrictor is formed by an upper portion of said valve plug adjacent said enlarged-diameter segment and said valve seat, and the tertiary variable restrictor is formed by a lower portion of said valve plug adjacent said enlarged diameter segment and said valve seat, and during a control operation, the secondary variable restrictor forms the small fluid path with said groove, and the tertiary variable restrictor forms the large fluid path between said secondary fluid vent and the outer circumference of the lower portion of said valve plug, and during normal braking, the secondary variable restrictor forms the large fluid path between said secondary fluid vent and the outer circumference of the upper portion of said valve plug, and the tertiary variable restrictor forms the small fluid path with the groove.

\* \* \* \* \*